（12）United States Patent
Kamann et al.

(10) Patent No.: US 12,179,751 B2
(45) Date of Patent: Dec. 31, 2024

(54) REMOTE TARGET VEHICLE TRACKING IN A REGION SURROUNDING A MOTOR VEHICLE

(71) Applicant: Continental Automotive GmbH, Hannover (DE)

(72) Inventors: Alexander Kamann, Regensburg (DE); Robert Naumann, Bad Griesbach i. Rotta (DE); Dagmar Steinhauser, Ingolstadt (DE); Thomas Brandmeier, Bad Abbach (DE); Andreas Forster, Wörth an der Donau (DE); Holger Faisst, Sinzing (DE); Frank Gruson, Lindau (DE)

(73) Assignee: Continental Automotive GmbH, Hannover (DE)

( * ) Notice: Subject to any disclaimer, the term of this patent is extended or adjusted under 35 U.S.C. 154(b) by 292 days.

(21) Appl. No.: 17/755,395

(22) PCT Filed: Oct. 14, 2020

(86) PCT No.: PCT/DE2020/200084
§ 371 (c)(1),
(2) Date: Apr. 28, 2022

(87) PCT Pub. No.: WO2021/083464
PCT Pub. Date: May 6, 2021

(65) Prior Publication Data
US 2023/0034560 A1 Feb. 2, 2023

(30) Foreign Application Priority Data
Oct. 31, 2019 (DE) .................... 10 2019 216 805.1

(51) Int. Cl.
*B60W 30/095* (2012.01)
*B60W 40/13* (2012.01)

(52) U.S. Cl.
CPC .......... *B60W 30/095* (2013.01); *B60W 40/13* (2013.01); *B60W 2040/1315* (2013.01); *B60W 2420/408* (2024.01)

(58) Field of Classification Search
CPC ........................... B60W 30/095; B60W 40/13
See application file for complete search history.

(56) References Cited

U.S. PATENT DOCUMENTS 10,037,613 B1\* 7/2018 Becker .................. G06T 7/277
2012/0326913 A1 6/2012 Nagy
(Continued)

FOREIGN PATENT DOCUMENTS

DE 102012021461 A1 5/2013
DE 102016106299 A1 10/2016
(Continued)

OTHER PUBLICATIONS

JP Notice of allowance mailed Aug. 2, 2023 of counterpart JP application 2022-519592 and Global Dossier translation of same.
(Continued)

*Primary Examiner* — Jess Whittington (57) ABSTRACT

A collision detection device on a motor vehicle for tracking a remote target vehicle for the detection of an imminent collision by fusing radar sensor data from a first environment sensor designed as a radar sensor with sensor data from a second environment sensor. First wheel acquisition data based on the radar sensor data from the first environment sensor and second wheel acquisition data based on sensor data from the second environment sensor are merged and a parameter of the target vehicle is established.

15 Claims, 3 Drawing Sheets

(56) References Cited

U.S. PATENT DOCUMENTS

| | | | |
|---|---|---|---|
| 2016/0291145 A1* | 10/2016 | Zeng | G01S 7/415 |
| 2016/0291149 A1* | 10/2016 | Zeng | G01S 13/874 |
| 2018/0330175 A1* | 11/2018 | Corcoran | G06V 10/147 |
| 2019/0337512 A1* | 11/2019 | Tahmasbi-Sarvestani | G08G 1/167 |
| 2019/0375422 A1* | 12/2019 | Shtrom | G01S 13/931 |

FOREIGN PATENT DOCUMENTS

| | | |
|---|---|---|
| DE | 102018206500 A1 | 10/2019 |
| EP | 2538239 A1 | 12/2012 |
| EP | 3285230 A1 | 2/2018 |
| JP | 2015035019 A | 2/2015 |
| JP | 2015197369 A | 11/2015 |
| JP | 2021124422 A | 8/2021 |
| WO | 2009092374 A1 | 7/2009 |
| WO | 2019181448 A1 | 9/2019 |

OTHER PUBLICATIONS

German Search Report dated Sep. 17, 2020 for the counterpart German Application No. 10 2019 216 805.1.

The International Search Report and the Written Opinion of the International Searching Authority mailed on Jan. 18, 2021 for the counterpart PCT Application No. PCT/DE2020/200084.

Notice of Reasons for Refusal drafted Feb. 9, 2023, for the counterpart Japanese Patent Application No. 2022-519592 and Global Dossier Translation.

* cited by examiner

REMOTE TARGET VEHICLE TRACKING IN A REGION SURROUNDING A MOTOR VEHICLE

BACKGROUND

1. Field

Embodiments of the present application relate to a method for tracking a remote target vehicle in a region surrounding a motor vehicle by means of a collision detection device of the motor vehicle for the detection of an imminent collision with the target vehicle. Furthermore, embodiments of the present application relate to a collision detection device for a motor vehicle for the detection of an imminent collision with a remote target vehicle.

2. Description of Related Art

In modern motor vehicles, sensors are increasingly deployed in order to capture the surroundings and, in particular, the traffic situation and other road users. Such environment sensors are usually an integral part of a collision detection device for the detection of an imminent collision. Radar sensors, lidar sensors, camera sensors or the like are regularly deployed as environment sensors. The monitoring of the surroundings by means of a radar sensor is based on, for example, the emission of bundled electromagnetic waves and the reflection thereof, in particular by the peripheral development of the road or other vehicles.

The process of activating a passive safety system of a motor vehicle, for example an airbag or a seat-belt tensioner, in the event of a collision with a collision object, for example a vehicle, is additionally known from the prior art. The safety system usually triggers shortly after the moment of impact, i.e., only after the collision has already occurred. However, as explained above, collision detection devices which detect a moment at which an impact is unavoidable by corresponding sensors and by evaluating the signals thereof, are already known. This moment lies in the so-called pre-crash phase and is therefore before the actual moment of the collision. With this information, the safety system is already activated shortly before the collision in order to thus be able to provide even better protection against injuries to the occupants of a motor vehicle.

With regard to the activation of a passive safety system, in particular in the pre-crash phase, it is advantageous if not only collision-relevant data of the ego motor vehicle are known, but also collision-relevant data of a target vehicle, with which a collision is imminent, are known. Such collision-relevant data of a target vehicle are, for example, the velocity, acceleration, yaw rate and wheel steering angle. Since said collision-relevant data can still change very significantly, in particular immediately before a collision, for example due to a sharp steering and/or braking maneuver or a skidding situation, it is essential, in order to establish the data as exactly as possible, to track the target vehicle sufficiently reliably, including in the vicinity of the motor vehicle, in particular below approximately 2 m.

SUMMARY

Based on this, an object of an embodiment is a method for tracking a remote target vehicle in a region surrounding a motor vehicle as well as a corresponding collision detection device, by means of which it is possible to track the target vehicle sufficiently accurately in the vicinity and, based on this, it is in particular possible to establish collision-relevant data in a sufficiently accurate manner.

In the case of the method according to an embodiment for tracking a remote target vehicle in a region surrounding a motor vehicle by means of a collision detection device of the motor vehicle for the detection of an imminent collision with the target vehicle by fusing radar sensor data from a first environment sensor designed as a radar sensor with sensor data from a second environment sensor of the collision detection device, the radar sensor and the second environment sensor each have capturing ranges which overlap in such a way that at least a partial region of the target vehicle is captured by both environment sensors. The method comprises the following steps:

providing radar sensor data and sensor data of the target vehicle by means of the radar sensor and the second environment sensor, wherein radar reflection points are derived from the radar sensor data, which determine a position specified by a distance and an azimuth angle and a Doppler velocity of points on the target vehicle, identifying a wheel of the target vehicle from the radar reflection points, with a uniformly sized two-dimensional window with an extent in the distance dimension and in the azimuth angle dimension being laid in each case around each radar reflection point and a total of the variances of the Doppler velocities of all radar reflection points contained in the window being established and assigned to the corresponding radar reflection point, and wherein a radar reflection point is determined as a point on a wheel, the total assigned to which is greater than a predefined threshold value, providing first wheel acquisition data based on the wheel identified from the radar reflection points, identifying a wheel of the target vehicle from the sensor data of the second environment sensor and providing second wheel acquisition data based on the wheel identified from the sensor data, merging the first wheel acquisition data and the second wheel acquisition data, establishing a parameter of the target vehicle based on the merged first and second wheel acquisition data.

An embodiment is initially based on the consideration that the accuracy of the tracking of a remote target vehicle can be increased if the tracking is not based solely on the sensor data of a single environment sensor. An embodiment is further based on the consideration that a wheel of a target vehicle has a particular movement characteristic which, due to the micro-Doppler effect, is reflected in the radar sensor data captured by means of a radar sensor, as a result of which a wheel and, based on this, a parameter of the target vehicle can be reliably identified. This makes use of the fact that the movement of a wheel deviates from the movement of the body of the target vehicle or rotates additionally to the movement of the body of the target vehicle and this generates a Doppler modulation around the main Doppler shift, which can be evaluated.

An embodiment therefore provides for the use of two environment sensors for identifying a wheel of the target vehicle and fusing the corresponding sensor data, wherein a first environment sensor is designed as a radar sensor. A particularly reliable process of identifying a wheel by means of a radar sensor is achieved in that a uniformly sized two-dimensional window with an extent in the distance dimension and in the azimuth angle dimension is laid in each case around each radar reflection point and a total of the variances of the Doppler velocities of all radar reflection points contained in the window is established and assigned to the corresponding radar reflection point, wherein a radar reflection point is determined as a point on a wheel, the total assigned to which is greater than a predefined threshold value. The deviation of the velocity components caused by a (rotating) wheel is thus established and assessed. In this case, it is provided that, thanks to the uniformly sized two-dimensional window which is laid over each radar reflection point, a kind of standardization is effected and a further characteristic variable is assigned to each radar reflection point with the total of the variances of the Doppler velocities of all radar reflection points contained in the window, said characteristic variable making possible a reliable assessment.

The advantage of the configuration according to an embodiment is that it provides a method which makes it possible to track the target vehicle in the vicinity sufficiently accurately and, based on this, in particular makes it possible to establish collision-relevant data sufficiently accurately.

Within the framework of this application, the term "establishing" can be understood to mean, for example, calculating. Such a calculation can be effected, for example, in a microcontroller, a microprocessor or another programmable or hard-wired unit. In addition, it should be understood that the remote target vehicle which is being tracked is typically not the vehicle which is carrying out the method.

Establishing or calculating can in particular also be understood to mean that not only is a datum or data established as such, but said data are established or calculated as a probability distribution or in some other way with respect to the probabilities of the occurrence of determined values. For example, corresponding values can also be estimated.

All the wheels of the target vehicle, for which this is possible per se, are preferably identified in particular as a function of the capturing ranges of the first environment sensor designed as a radar sensor and of the second environment sensor. First wheel acquisition data and second wheel acquisition data are then correspondingly established or provided in each case for each identified wheel.

The two-dimensional window can in particular be a so-called sliding window known to the person skilled in the art from radar technology, which passes through the radar reflection points in chronological succession or is laid around each radar reflection point.

In an advantageous embodiment, deriving the radar reflection points from the radar sensor data comprises the following steps:
  establishing radar reflection points by means of a Fourier transform from the radar sensor data,
  separating the radar reflection points from the noise of the radar sensor data with the aid of a CFAR filter, and
  identifying the radar reflection points which are reflected by the target vehicle by a cluster method, preferably a DBSCAN method.

A three-dimensional Fourier spectrum of radar reflection points with distance, azimuth angle and Doppler velocity is advantageously formed by means of the Fourier transform. The separation of the radar reflection points from the noise of the radar sensor data with the aid of a CFAR filter (constant false alarm rate filter) serves to identify the radar reflection points reflected by an object and in particular by the target vehicle or to distinguish them from the signal noise contained in the radar sensor data. The identification of the radar reflection points which are reflected by the target vehicle, by a cluster method, is based on the fact that the individual radar reflection points are viewed as an integral whole which represents the target vehicle. A clustering algorithm designed as DBSCAN (Density-Based Spatial Clustering of Applications with Noise) is preferably used as the cluster method. The DBSCAN is a spatial cluster analysis which is based on a density-based algorithm, with the aid of which one or more clusters can be detected.

In a further advantageous embodiment, establishing the total of the variances of the Doppler velocities of all radar reflection points contained in a window comprises the following steps:
  establishing an arithmetic average from the Doppler velocities of all radar reflection points contained in the window,
  establishing a variance of the Doppler velocity of a radar reflection point as the difference between the Doppler velocity of the radar reflection point and the average in each case of all radar reflection points contained in the window, and
  totaling the established variances of the Doppler velocities of all radar reflection points contained in the window.

In this way, the total of the variances of the Doppler velocities of all radar reflection points contained in a window can be established particularly accurately and reliably.

In a further advantageous embodiment, identifying a wheel of the target vehicle from the radar reflection points further comprises the following steps:
  assigning the radar reflection points determined as a point on a wheel to a wheel cluster by a cluster method, preferably a DBSCAN method, and
  determining the wheel cluster as a wheel of the target vehicle.

In the case of a double-tracked, two-axled vehicle, for example, as the target vehicle, a maximum of four wheel clusters can consequently be generated, in particular depending on the capturing range of the radar sensor.

In a further advantageous embodiment, providing first wheel acquisition data comprises the following steps:
  calculating the position data of a wheel center of gravity based on the radar reflection points assigned to a wheel cluster, and
  providing the position data of the wheel center of gravity as first wheel acquisition data.

The wheel center of gravity or the position data of the wheel center of gravity represent the position of the wheel. The position data are represented in particular by a x value and a y value in a reference coordinate system of the motor vehicle. The position data are preferably established by averaging the corresponding x values and y values of the radar reflection points assigned to the (common) wheel cluster.

In a further advantageous embodiment, providing first wheel acquisition data further comprises the following steps:
  determining an azimuth angle value of the radar reflection point which is positionally closest to the wheel center of gravity,
  merging the radar reflection points which have the determined azimuth angle value as the azimuth angle value into a group,
  establishing that radar reflection point of the group, which has the relatively highest intensity value within the group and which at the same time was not determined as a point on a wheel,
  providing the Doppler velocity of the established radar reflection point as the velocity of the target vehicle at the position of the wheel center of gravity as first wheel acquisition data.

In this way, the velocity of the target vehicle at the position of the wheel center of gravity can be established and provided relatively accurately. Since there are many points with a higher reflectivity compared to the wheels on the body of the target vehicle, a search is thus performed virtually for the measured maximum intensity among all the radar reflection points which have the same or approximately the same azimuth angle as the wheel under consideration or the wheel center of gravity under consideration and which, at the same time, were not determined as a point on a wheel. This guarantees as far as possible that the radar reflection point established in such a way does not actually correspond to a point on the wheel either, but in particular to a point on the body of the target vehicle.

In addition, a rate of rotation of the target vehicle can be advantageously established on the basis of the Doppler velocity established and provided in such a way as the velocity of the target vehicle at the position of the wheel center of gravity.

In a further advantageous embodiment, merging the first wheel acquisition data and the second wheel acquisition data comprises the following steps:
  assigning the first wheel acquisition data and the second wheel acquisition data in each case to a target vehicle axis and a target vehicle side,
  merging the first wheel acquisition data and second wheel acquisition data assigned to a common target vehicle axis and target vehicle side based on a covariance intersection algorithm.

The use of a covariance intersection algorithm during the step of merging the first and second wheel acquisition data assigned to a common target vehicle axis and target vehicle side ensures a convergent fusion of the first wheel acquisition data with the second wheel acquisition data.

In order to assign the first wheel acquisition data and the second wheel acquisition data, wheel gates, to which the first wheel acquisition data and the second wheel acquisition data are in each case assigned, in particular based on position data of the first wheel acquisition data and the second wheel acquisition data, are advantageously generated. Four wheel gates are thus generated for a double-tracked, two-axle vehicle as the target vehicle, namely in each case a front-right wheel gate, a front-left wheel gate, a rear-right wheel gate and a rear-left wheel gate, wherein the first wheel acquisition data and the second wheel acquisition data are in each case assigned to the corresponding wheel gate.

During the step of merging the first wheel acquisition data and second wheel acquisition data, the first wheel acquisition data and second wheel acquisition data, which are contained in each case in a common wheel gate, are then advantageously merged.

The wheel gates are expediently generated geometrically in a model-based manner and are derived from a predefined geometry of the target vehicle and scaled with the aid of the target vehicle dimensions. Alternatively or additionally, the wheel gates can be generated dynamically based on the first wheel acquisition data and/or the second wheel acquisition data, wherein the dimensioning of the wheel gates is specified with the aid of a predefined wheel diameter.

In a further advantageous embodiment, the parameter of the target vehicle is fed to a tracking filter for tracking the target vehicle.

In a further advantageous embodiment, the parameter of the target vehicle is fed to an unscented Kalman filter as a tracking filter, by means of which the current position of the target vehicle is estimated with the aid of the parameter. This is a non-linear Kalman filter variant which is based on model-based prediction with subsequent correction with the aid of the available measurement data.

In a further advantageous embodiment, the parameter of the target vehicle is fed to multiple different unscented Kalman filters as tracking filters, wherein the multiple different unscented Kalman filters are each based on a different motion model. Here, it is provided that the multiple different unscented Kalman filters are combined with one another and, in particular, are each given a weighting. The IMM (Interacting Multiple Model) method known to the person skilled in the art can preferably be used for this. The IMM method defines an interaction of multiple unscented Kalman filters which process the same measurement data in parallel.

By providing and combining such multiple different unscented Kalman filters as tracking filters, which are each based on a different motion model, different possible situations can advantageously be dealt with and these can be considered accordingly so that flexible adaptation to a specific situation can be advantageously brought about.

Unscented Kalman filters based on one of the following four motion models are advantageously used as unscented Kalman filters:
  Constant Velocity Motion Model
  Constant Acceleration Motion Model
  Constant Steering Angle and Velocity Model
  Motion model with explicit side slip angle estimation and non-linear single-track model.

In particular, at least four unscented Kalman filters are used, wherein each of the four unscented Kalman filters is based on a determined motion model of the aforementioned motion models so that all four motion models indicated above are mapped.

In a further advantageous embodiment, the parameter of the target vehicle is a geometric center of gravity of the target vehicle. The target vehicle can be easily characterized and tracked in terms of its position and/or its course, in particular in the vicinity of the motor vehicle, by means of such a geometric center of gravity. For example, compared with a radar reflection point of the surface or body of the target vehicle, which "wanders" during a driving maneuver, the geometric center of gravity is deterministic. Even in the event that the target vehicle is no longer completely located in the capturing range of the environment sensors, in particular is located at least partially in a so-called blind spot, it is still possible to accurately track the target vehicle based on its geometric center of gravity.

The geometric center of gravity is established from the fused first and second wheel acquisition data and, consequently, advantageously from the fused position data of at least one wheel or wheel center of gravity, in particular from the fused position data of all the identified wheels. However, the geometric center of gravity can also be established from the fused position data and the velocity data of the target vehicle at the position of the wheel center of gravity of at least one wheel, in particular from the fused position data and the velocity data of the target vehicle at the corresponding positions of the wheel centers of gravity of all the identified wheels. The geometric center of gravity can be calculated or estimated, for example based on a model, from the corresponding data.

In addition to the center of gravity of the target vehicle, a yaw rate and/or a velocity of the target vehicle in particular, preferably a relative velocity between the motor vehicle and the target vehicle, are advantageously established as further parameters of the target vehicle from the corresponding data of one or more wheels. The yaw rate is advantageously established based on the velocity of the target vehicle at the position of the wheel center of gravity of at least one wheel, in particular based on the velocities of the target vehicle at the corresponding positions of the wheel centers of gravity of all the identified wheels. Knowledge of these parameters further increases the accuracy of the tracking of the target vehicle and, based on this, the accuracy of the establishment and/or specification of collision-relevant data.

The second environment sensor can be designed, for example, as a camera or as a (further) radar sensor. The embodiments explained for the first environment sensor designed as a radar sensor apply accordingly to the use of the (further) radar sensor as the second environment sensor.

In a further advantageous embodiment, the second environment sensor is, however, designed as a lidar sensor, wherein the sensor data comprise lidar reflection points. Remote objects such as, for example, the remote target vehicle which is to be tracked are typically illuminated by means of a laser or another light source, and lidar reflection points generated as a result are recorded by means of a lidar sensor.

Lidar reflection points of the target vehicle can initially be selected from a recorded quantity of lidar reflection points, that is to say those lidar reflection points can be identified, which are assigned to the remote target vehicle or originate from the latter.

In an advantageous embodiment, identifying a wheel of the target vehicle from the sensor data of the lidar sensor comprises selecting lidar reflection points of the target vehicle with a predefined maximum height above ground, wherein a wheel is only identified based on the selected lidar reflection points. A wheel is the sole component of a vehicle which touches the ground so that lidar reflection points of the target vehicle, which are a predefined maximum height above ground, can only originate from a wheel anyway. This makes it possible to accurately and reliably identify a wheel. In addition, further processing can be considerably simplified since only a really limited quantity of lidar reflection points have to be further processed.

In a further advantageous embodiment, providing second wheel acquisition data comprises the following steps:
identifying selected lidar reflection points which have at least a predefined number of neighboring lidar reflection points within a predefined spacing, as core points,
identifying selected lidar reflection points which are at most the predefined spacing from at least one core point, but have less than the predefined number of neighboring lidar reflection points within the predefined spacing, as boundary points,
detecting a respective segment as a region of core points surrounded by boundary points, wherein each segment is assigned to a tire tread or a tire sidewall,
fitting a respective section through each segment,
establishing a respective perpendicular to each of the sections in the middle of the respective section,
establishing a wheel center as the intersection of these perpendiculars, and
providing the position data of the wheel center as second wheel acquisition data.

Such a procedure for classifying core points and boundary points and detecting segments based thereon has proven to be a reliable and quick possible way of detecting segments for typical applications. It should be understood that lidar reflection points which do not meet any of the criteria for core points or boundary points can be referred to as noise points. A tire tread and a tire sidewall are typical features of a wheel, which cause a considerable number of lidar reflection points and, accordingly, lead to numerous detected lidar reflection points. Establishing the wheel center is based on the assumption that a wheel center is typically located at an intersection of the aforementioned perpendiculars. In particular, it can also be located above such an intersection. The position data are represented in particular by a x value and a y value in a reference coordinate system of the motor vehicle.

The corresponding wheel center is advantageously established based on a wheel model and/or other information on a wheel of the target vehicle, on which both a section of a tire tread and a section of a tire sidewall were not fitted. For example, it can be assumed that the typically four wheels of a target vehicle have the same design. Consequently, it is possible to use spacings which were detected for one wheel to extrapolate spacings or the wheel center for another wheel, for example, for which insufficient lidar reflection points were recorded to separately establish the wheel center. This can occur, for example, if the corresponding wheel is covered by another wheel or other objects.

In a further advantageous embodiment, providing second wheel acquisition data additionally comprises the following steps:
establishing a wheel steering angle of the target vehicle based on the fitted sections, and
providing the wheel steering angle as second wheel acquisition data.

Both the tire tread and the tire sidewall typically depend directly on the wheel steering angle. It was detected that this relationship can be advantageously used to establish the wheel steering angle, i.e., for example, an angle of steered wheels relative to other elements of a body or a longitudinal axis of the remote target vehicle. Knowledge of the wheel steering angle of the target vehicle further increases the accuracy of the tracking of the target vehicle and, based on this, the accuracy of establishing collision-relevant data, since the target vehicle's course currently desired by the driver of the target vehicle or an autonomous vehicle control system can in particular be derived from this.

In a further advantageous embodiment, the method additionally has the step of establishing collision-relevant data based on the tracking of the target vehicle with the aid of the parameter. Establishing can also comprise, in particular, specifying a wheel steering angle which is advantageously provided as second wheel acquisition data and/or an established parameter such as, advantageously, the yaw rate and/or velocity of the target vehicle as collision-relevant data. Such collision-relevant data can in particular be used, in particular in a pre-crash phase, to activate passive safety systems in a targeted manner such as, for example, tensioning a seat belt or triggering an airbag. It is also possible to intervene in a control system of the motor vehicle carrying out the method in order, for example, to execute an evasive maneuver or to ensure that the collision occurs at a less critical point of the motor vehicle.

The present invention additionally comprises a collision detection device for a motor vehicle for the detection of an imminent collision with a remote target vehicle having a first environment sensor designed as a radar sensor and a second environment sensor as well as a control unit. The control unit is configured to track the remote target vehicle in a region surrounding the motor vehicle with the aid of the method according to an embodiment.

The advantages and preferred embodiments described for the method according to an embodiment also apply accordingly to the collision detection device according to an embodiment.

BRIEF DESCRIPTION OF THE DRAWINGS

Exemplary embodiments of an embodiment are explained in greater detail below with reference to a drawing, wherein.

Corresponding parts are constantly provided with the same reference numerals in all figures.

DETAILED DESCRIPTION

Figure 1:
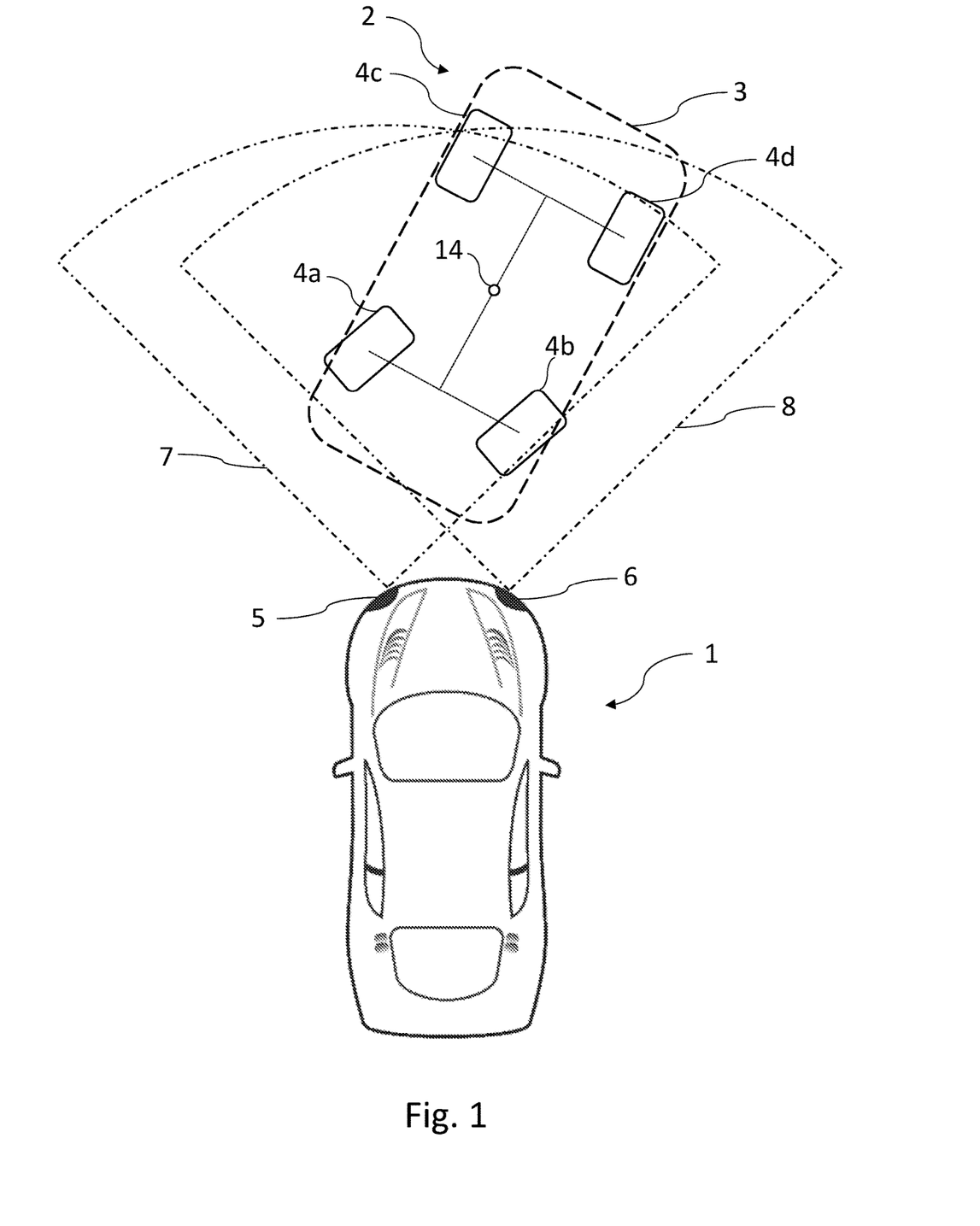
FIG. 1 shows a schematic representation of a motor vehicle for carrying out the method according to an embodiment together with a remote target vehicle.

FIG. 1 schematically shows a motor vehicle 1 and a remote target vehicle 2. The target vehicle 2 comprises a body 3 and four wheels 4a, 4b, 4c, 4d. In the representation shown in FIG. 1, the motor vehicle 1 and the remote target vehicle 2 are moving toward one another in such a way that a substantially frontal collision is imminent.

The motor vehicle 1 has a collision detection device for the detection of an imminent collision with the remote target vehicle 2. The collision detection device comprises a first environment sensor 5 designed as a radar sensor and a second environment sensor 6 designed as a lidar sensor as well as a control unit which carries out a method 100 for tracking the remote target vehicle 2. The radar sensor 5 is used in a fast mode, during which the data acquisition time is reduced by reducing the number of chirps per frame in order to obtain optimal cycle times. The radar sensor 5 and the lidar sensor 6 typically communicate with the control unit and provide their respective data to the control unit via a motor vehicle bus, wherein this communication could also be wireless.

The radar sensor 5 and the lidar sensor 6 are oriented in a forward direction and intended to capture the surroundings and target vehicle forwards. The capturing range 7 of the radar sensor 5 and the capturing range 8 of the lidar sensor 6 overlap in such a way that at least a partial region of the target vehicle 2 is captured by both environment sensors 5, 6. However, the method can also be correspondingly applied for a sideward and/or backward alignment.

Figure 2:
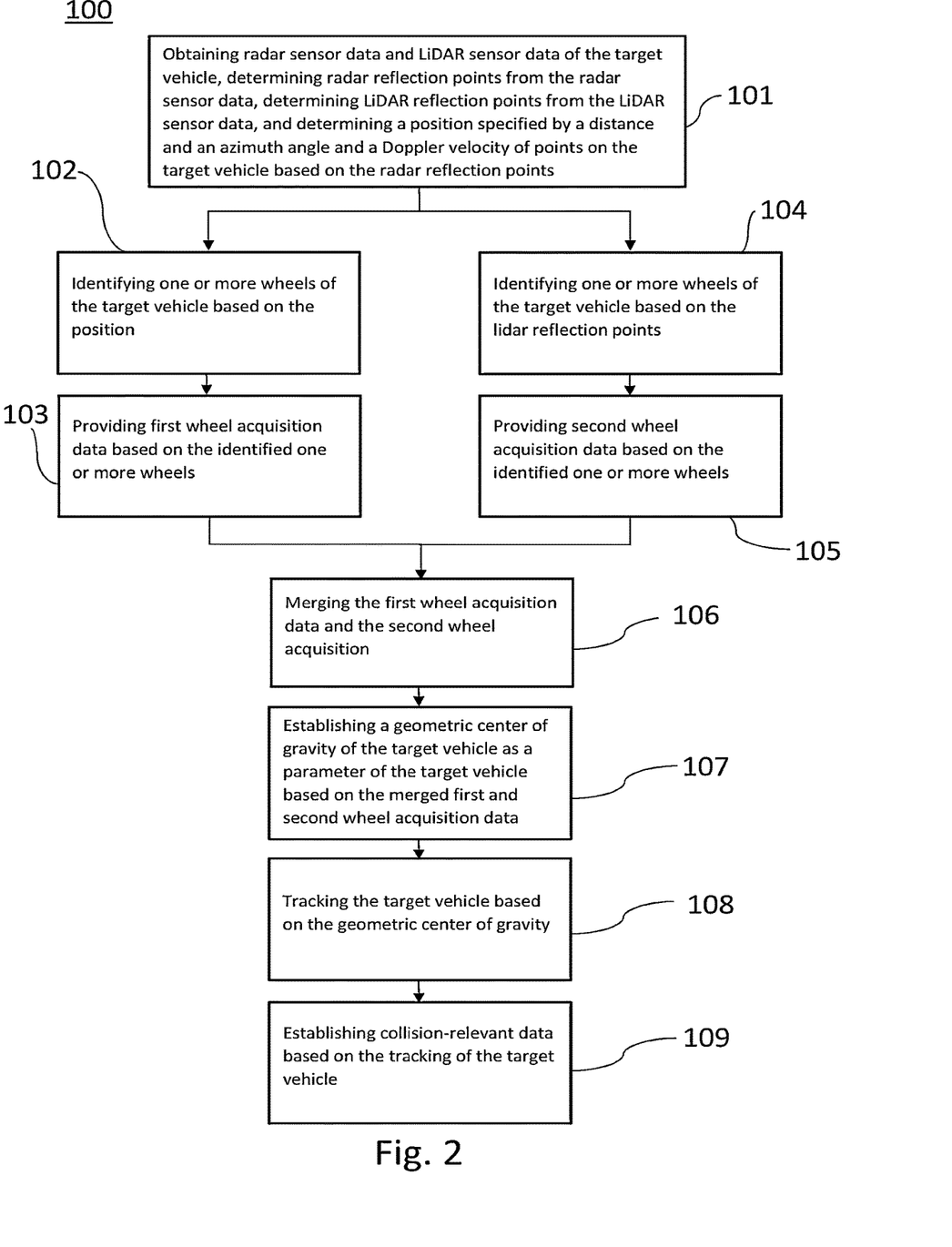
FIG. 2 shows a flow chart of a method for tracking the remote target vehicle in a region surrounding the motor vehicle according to FIG. 1.

FIG. 2 shows a flow chart of a method 100 for tracking a remote target vehicle 2 in a region surrounding a motor vehicle 1 according to FIG. 1. The procedure is thus described below with reference to a situation in which a collision is imminent.

In a step 101, radar sensor data of the radar sensor 5 as well as sensor data of the lidar sensor 6, which comprise lidar reflection points 9, are initially provided. Radar reflection points are derived from the radar sensor data, which determine a position specified by a distance and an azimuth angle and a Doppler velocity of points on the target vehicle 2. To this end, a three-dimensional Fourier spectrum of radar reflection points with distance, azimuth angle and Doppler velocity is initially formed based on the radar sensor data by means of a Fourier transform. The radar reflection points are subsequently separated from the noise of the radar sensor data with the aid of a CFAR filter in order to identify the radar reflection points reflected by the target vehicle 2 or to distinguish them from the signal noise contained in the radar sensor data. Those radar reflection points which are reflected by the target vehicle 2 are then identified by a cluster method designed as a DBSCAN method.

In addition, lidar reflection points 9 of the target vehicle 2 are selected from a recorded quantity of lidar reflection points 9, that is to say those lidar reflection points 9 are identified, which are assigned to the remote target vehicle 2 or originate from the latter.

In a step 102, one or more wheels 4a, 4b, 4c, 4d of the target vehicle 2 is/are then identified from the radar reflection points. In this case, the particular movement characteristics of a (rotating) wheel 4a, 4b, 4c, 4d of the target vehicle 2 are utilized as well as the fact that the movement of a wheel 4a, 4b, 4c, 4d deviates from the movement of the body 3 of the target vehicle 2 or rotates additionally to the movement of the body 3 of the target vehicle 2 and this, based on the micro-Doppler effect, generates a Doppler modulation around the main Doppler shift, which can be evaluated. For example, a wheel center moves at the same velocity as the body 3 of the target vehicle 2. A point located centrally at the top of the outer radius of the wheel 4a, 4b, 4c, 4d moves at approximately twice the velocity of the body 3 of the target vehicle 2 due to the rotation of the wheel 4a, 4b, 4c, 4d. In contrast, the velocity of a point located centrally at the bottom of the outer radius of the wheel 4a, 4b, 4c, 4d is zero or slightly greater than zero due to the rotation of the wheel 4a, 4b, 4c, 4d.

Consequently, the different velocities of the points of a wheel 4a, 4b, 4c, 4d result in different Doppler velocities of the corresponding radar reflection points, some of which deviate considerably from one another and which (in particular apart from the Doppler velocity of the radar reflection points corresponding to the wheel center) deviate, in addition, from the Doppler velocity of the radar reflection points of the body 3. This variance in the Doppler velocities of the radar reflection points is utilized within the framework of identifying one or more wheels 4a, 4b, 4c, 4d of the target vehicle 2.

To this end, a uniformly sized two-dimensional window with an extent in the distance dimension and in the azimuth angle dimension is laid in each case around each radar reflection point and a total of the variances of the Doppler velocities of all radar reflection points contained in the window is established. For this purpose, an arithmetic average is initially established from the Doppler velocities of all radar reflection points contained in the window. The variance of the Doppler velocity of a radar reflection point is then calculated as the difference between the Doppler velocity of the radar reflection point and the average in each case for all radar reflection points contained in the window. Subsequently, the total of the established variances of the Doppler velocities of all radar reflection points contained in the window is calculated and assigned to the corresponding radar reflection point. A radar reflection point, the assigned total of which is greater than a predefined threshold value, is determined as a point on a wheel 4a, 4b, 4c, 4d.

The radar reflection points determined as a point on a wheel 4a, 4b, 4c, 4d of the target vehicle 2 are subsequently assigned to a wheel cluster by applying a cluster method designed as a DBSCAN method and the wheel cluster is determined as a wheel 4a, 4b, 4c, 4d of the target vehicle 2.

In this way, one or more wheels 4a, 4b, 4c, 4d of the target vehicle can be identified extremely reliably.

In a step 103, first wheel acquisition data based on one or more wheels 4a, 4b, 4c, 4d identified from the radar reflection points are subsequently provided. To this end, the position data of a respective wheel center of gravity as well as the respective velocity data of the target vehicle at the positions of the corresponding wheel centers of gravity are established for each identified wheel 4a, 4b, 4c, 4d, based on the radar reflection points assigned to a corresponding wheel cluster and are provided as first wheel acquisition data for the respective wheel 4a, 4b, 4c, 4d.

The wheel center of gravity or the position data of the wheel center of gravity represent the position of the corresponding wheel 4a, 4b, 4c, 4d. The position data are represented in each case by a x value and a y value in a reference coordinate system of the motor vehicle 1 and established by averaging the corresponding x values and y values of the radar reflection points assigned to the corresponding wheel cluster.

In order to establish the velocity data of the target vehicle at the positions of the corresponding wheel centers of gravity, an azimuth angle value of the radar reflection point which is positionally closest to the wheel center of gravity is in each case initially determined for each identified wheel 4a, 4b, 4c, 4d. The radar reflection points which have the determined azimuth angle value as the azimuth angle value are then combined into a group. That radar reflection point of the group is established, which has the relatively highest intensity value within the group and which at the same time was not determined as a point on the corresponding wheel 4a, 4b, 4c, 4d. The Doppler velocity of the radar reflection point established in such a way is provided as the velocity of the target vehicle 2 at the position of the corresponding wheel center of gravity as (further) first wheel acquisition data.

In a step 104, which can run parallel to step 102, one or more wheels 4a, 4b, 4c, 4d of the target vehicle 2 are identified from the lidar reflection points 9 of the lidar sensor 6. To this end, only the first lidar reflection points 9 of the target vehicle 2, which are located above the ground or are only located at most a predefined spacing above the ground, are assigned to the wheels 4a, 4b, 4c, 4d. The wheels 4a, 4b, 4c, 4d are the sole components of a target vehicle 2, which touch the ground, so that lidar reflection points 9 of the target vehicle 2, which are a predefined maximum height above ground, can only originate from a wheel 4a, 4b, 4c, 4d anyway. This makes it possible to identify one or more wheels 4a, 4b, 4c, 4d accurately and reliably. In addition, the further processing can be considerably simplified, since only a really limited quantity of lidar reflection points 9 has to be further processed.

Figure 3:
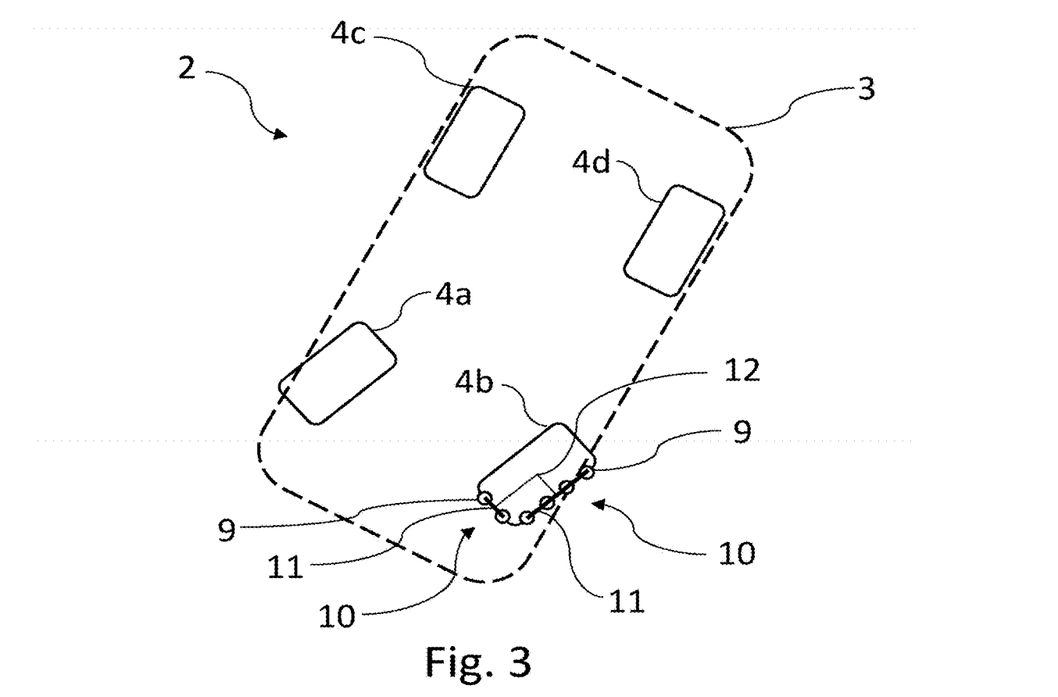
FIG. 3 shows a schematic representation of providing second wheel acquisition data of the target vehicle according to FIG. 1.

In a step 105, second wheel acquisition data are then provided based on one or more wheels 4a, 4b, 4c, 4d identified from the lidar reflection points 9. This is illustrated in FIG. 3 with the aid of a schematic representation of the target vehicle 2 according to FIG. 1, by way of example, for a wheel 4b.

The corresponding lidar reflection points 9 on the wheel 4b are clustered or segmented with a density-based method. Individual lidar reflection points are solely provided with the reference numeral 9 in FIG. 3 so as not to overload the image. For example, lidar reflection points 9 lying close to one another can be considered, which are separated from one another by a certain space with few points. Lidar reflection points 9, which have at least a predefined number of further lidar reflection points 9 within a previously determined distance or a predefined spacing, are core points. Core points, the spacing of which is smaller than the predefined spacing, typically belong to the same cluster or to the same segment 10. Lidar reflection points 9 which do not meet this criterion but lie close to a cluster or segment 10 are classified as boundary points. Lidar reflection points 9 which do not meet both criteria are deemed to be noise points. Consequently, two segments 10 are provided on the wheel 4b, wherein one segment 10 has two lidar reflection points 9 and a further segment 10 has four lidar reflection points 9.

A line or section 11 is now fitted into the segmented lidar reflection points 9, which represents the position and angle of the tire tread of the wheel 4b, and a further section 11 is fitted, which represents the tire sidewall. The tire tread is indicated in FIG. 3 by two lidar reflection points 9, whereas the tire sidewall is indicated by four lidar reflection points 9.

These two lines or sections 11 are perpendicular to one another. With the help of the placement of a perpendicular on the lines 11, an intersection of the perpendiculars is created, which reproduces a wheel center 12 of the wheel 4b. The position data of the wheel center 12 are provided as second position data, in particular represented by a x value and a y value in the reference coordinate system of the motor vehicle 1. In addition, based on the fitted sections 11, a wheel steering angle can be established and provided as second wheel acquisition data.

In a step 106 of the method 100, the first wheel acquisition data and the second wheel acquisition data are then merged. To this end, the first wheel acquisition data and the second wheel acquisition data are initially assigned to a target vehicle axle and a target vehicle side.

To carry out this assignment, wheel gates 13a, 13b, 13c, 13d are generated, to which the first wheel acquisition data and the second wheel acquisition data are each assigned based on the corresponding position data of the first wheel acquisition data and the second wheel acquisition data.

Figure 4:
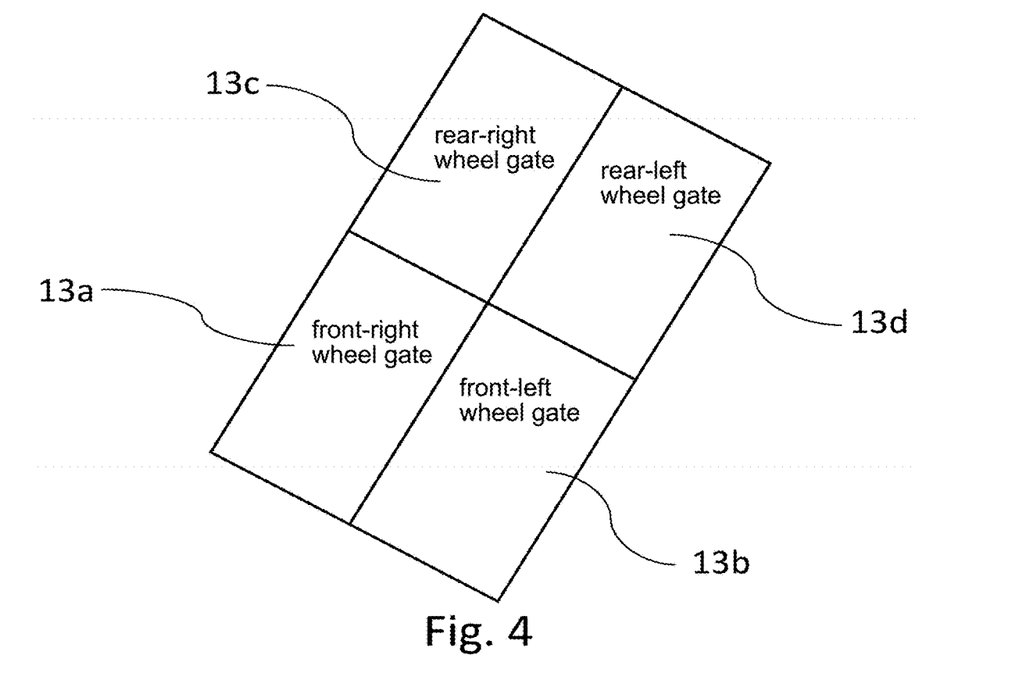
FIG. 4 shows a wheel gating of the target vehicle according to FIG. 1.

Such a wheel gating of the target vehicle 2 is depicted in FIG. 4. As a consequence, four wheel gates 13a, 13b, 13c, 13d are geometrically generated in a model-based manner and derived from a predefined geometry of the target vehicle 2 and scaled with the aid of the target vehicle dimensions for the target vehicle 2, which represents a double-tracked, two-axle vehicle. Alternatively or additionally, the wheel gates 13a, 13b, 13c, 13d can be generated dynamically based on the first wheel acquisition data and/or the second wheel acquisition data, wherein the dimensioning of the wheel gates 13a, 13b, 13c, 13d is specified with the aid of a predefined wheel diameter. Consequently, a front-right wheel gate 13a, a front-left wheel gate 13b, a rear-right wheel gate 13c and a rear-left wheel gate 13d are present, wherein the first wheel acquisition data and the second wheel acquisition data are in each case assigned to the corresponding wheel gate 13a, 13b, 13c, 13d.

The first wheel acquisition data and second wheel acquisition data, which are in each case contained in a common wheel gate 13a, 13b, 13c, 13d, are subsequently merged based on a covariance intersection algorithm. The use of a covariance intersection algorithm in the step involving merging the first and second wheel acquisition data assigned to a common wheel gate 13a, 13b, 13c, 13d ensures a convergent fusion of the first wheel acquisition data with the second wheel acquisition data.

In a step 107 of the method 100, the geometric center of gravity 14 of the target vehicle 2 is then established as a parameter of the target vehicle 2, based on the merged first and second wheel acquisition data. The geometric center of gravity 14 is calculated or estimated in particular from the fused position data of all identified wheels 4a, 4b, 4c, 4d, for example based on a model and/or by means of a so-called motion state transformation. The target vehicle 2 can be easily characterized and tracked in terms of its position and/or its course, in particular in the vicinity of the motor vehicle 1, by means of the geometric center of gravity 14. For example, compared with a determined radar reflection point of the body 3 of the target vehicle 2, which "wanders" during a driving maneuver, the geometric center of gravity 14 is deterministic. Even in the event that the target vehicle 2 is no longer located completely in the capturing range of the environment sensors 5, 6, is in particular located at least partially in a so-called blind spot, it is still possible to accurately track the target vehicle 2 based on its geometric center of gravity 14.

In addition, a yaw rate and a velocity of the target vehicle 2 are established as further parameters of the target vehicle 2 from the fused position data of all identified wheels 4a, 4b, 4c, 4d and velocity data at the corresponding positions of the wheel centers of gravity of all identified wheels 4a, 4b, 4c, 4d.

In a step 108, the geometric center of gravity 14 of the target vehicle 2 is fed to a tracking filter for tracking the target vehicle 2, by means of which the current position of the target vehicle 2 is estimated with the aid of the geometric center of gravity 14. The tracking filter comprises four different unscented Kalman filters which are each based on a different motion model. In this case, it is provided that the four different unscented Kalman filters are combined with one another and each given a weighting. The IMM (Interacting Multiple Model) method is used for this, which defines an interaction of the four unscented Kalman filters processing the geometric center of gravity 14 of the target vehicle 2 in parallel. The four unscented Kalman filters are based on the following four motion models:

Constant Velocity Motion Model
Constant Acceleration Motion Model
Constant Steering Angle and Velocity Model
Motion model with explicit side slip angle estimation and non-linear single-track model.

By providing and combining these four different unscented Kalman filters as tracking filters, it is advantageously possible to address different possible situations and take account of these accordingly, so that a flexible adaptation to a specific situation is advantageously brought about here and, therefore, tracking which is as accurate as possible can be achieved.

In a step 109, collision-relevant data such as, in particular, a yaw rate, a velocity and a wheel steering angle of the target vehicle 2 are established based on the tracking of the target vehicle 2 with the aid of the geometric center of gravity 14. Such an establishment is also to be understood in particular to be the specification as collision-relevant data of the wheel steering angle provided as second wheel acquisition data and the yaw rate and velocity of the target vehicle 2 established as parameters. Such collision-relevant data can be used, in particular in a pre-crash phase, in order to activate passive safety systems of the motor vehicle 1 in a targeted manner such as, for example, tensioning a seat belt or triggering an airbag. It is also possible to intervene in a control system of the motor vehicle 1 carrying out the method 100 in order to execute an evasive maneuver, for example, or to ensure that the collision occurs at a less critical point of the motor vehicle 1.

The invention claimed is:

1. A method of tracking a remote target vehicle in a region surrounding a motor vehicle, the method comprising:
   obtaining radar sensor data of the target vehicle from a radar sensor of the motor vehicle;
   obtaining LIDAR sensor data of the target vehicle from LIDAR sensor of the motor vehicle;
   determining radar reflection points from the radar sensor data;
   determining a position specified by a distance and an azimuth angle and a Doppler velocity of points on the target vehicle based on the radar reflection points;
   identifying a wheel of the target vehicle based on the position, with a uniformly sized two-dimensional window with an extent in a distance dimension and in an azimuth angle dimension being laid in each case around each radar reflection point and a total of the variances of the Doppler velocities of all radar reflection points contained in the two-dimensional window being established and assigned to the corresponding radar reflection point, and wherein a radar reflection point is determined as a point on a wheel, the total assigned to which is greater than a predefined threshold value;
   providing first wheel acquisition data based on the wheel identified from the radar reflection points;
   identifying a wheel of the target vehicle from the LIDAR sensor data of the LIDAR sensor;
   providing second wheel acquisition data based on the wheel identified from the LIDAR sensor data;
   merging the first wheel acquisition data and the second wheel acquisition data; and
   establishing a parameter of the target vehicle based on a result of merging the first wheel acquisition data and the second wheel acquisition data.

2. The method according to claim 1, wherein determining the radar reflection points from the radar sensor data comprises:
   establishing the radar reflection points by means of a Fourier transform from the radar sensor data;
   separating the radar reflection points from noise of the radar sensor data using a CFAR filter; and
   identifying the radar reflection points reflected by the target vehicle by a cluster method.

3. The method according to claim 1, further comprising establishing the total of the variances of the Doppler velocities of all radar reflection points contained in a window, wherein establishing the total of the variances comprises:
   establishing an arithmetic average from the Doppler velocities of all radar reflection points contained in the window;
   establishing a variance of the Doppler velocity of a radar reflection point as the difference between the Doppler velocity of the radar reflection point and an average in each case for all radar reflection points contained in the window; and
   totaling the established variances of the Doppler velocities of all radar reflection points contained in the window.

4. The method according to claim 1, wherein identifying the wheel of the target vehicle comprises:
   assigning the radar reflection points determined as a point on a wheel to a wheel cluster by a cluster method; and
   determining the wheel cluster as a wheel of the target vehicle.

5. The method according to claim 4, wherein providing the first wheel acquisition data comprises:
   calculating the position data of a wheel center of gravity based on the radar reflection points assigned to the wheel cluster; and
   providing the position data of the wheel center of gravity as the first wheel acquisition data.

6. The method according to claim 5, wherein providing the first wheel acquisition data further comprises:
   determining the azimuth angle value of the radar reflection point positionally closest to the wheel center of gravity;

merging the radar reflection points having the azimuth angle value as the azimuth angle value into a group;
establishing the radar reflection point of the group having a relatively highest intensity value within the group;
providing the Doppler velocity of the established radar reflection point as the velocity of the target vehicle at the position of the wheel center of gravity as the first wheel acquisition data.

7. The method according to claim 1, wherein merging the first wheel acquisition data and the second wheel acquisition data comprises:
assigning the first wheel acquisition data and the second wheel acquisition data in each case to a target vehicle axis and a target vehicle side; and
merging the first wheel acquisition data and second wheel acquisition data assigned to a common target vehicle axis and target vehicle side.

8. The method according to claim 1, further comprising providing the parameter to a tracking filter for tracking the target vehicle,
wherein the tracking filter comprises s an unscented Kalman filter configured to estimate the current position of the target vehicle based on the parameter.

9. The method according to claim 8, wherein the unscented Kalman filter comprises a plurality of Kalman filters, wherein each Kalman filter among the plurality of Kalman filters is based on a different motion model.

10. The method according to claim 1, wherein the parameter of the target vehicle is a geometric center of gravity of the target vehicle.

11. The method according to claim 1, wherein identifying the wheel of the target vehicle comprises selecting lidar reflection points of the target vehicle with a predefined maximum height above ground, and
wherein the wheel is identified based on only the selected lidar reflection points.

12. The method according to claim 11, wherein providing the second wheel acquisition data comprises:
identifying selected lidar reflection points having at least a predefined number of neighboring lidar reflection points within a predefined spacing, as core points;
identifying selected lidar reflection points having at most the predefined spacing from at least one core point, but have less than the predefined number of neighboring lidar reflection points within the predefined spacing, as boundary points;
detecting a respective segment as a region of core points surrounded by boundary points, wherein each segment is assigned to a tire tread or a tire sidewall;
fitting a respective section through each segment;
establishing a respective perpendicular to each of the sections in a middle of the respective section;
establishing a wheel center as the intersection of the respective perpendiculars; and
providing the position data of the wheel center as the second wheel acquisition data.

13. The method according to claim 12, wherein providing the second wheel acquisition data further comprises:
establishing a wheel steering angle of the target vehicle based on the fitted sections; and
providing the wheel steering angle as the second wheel acquisition data.

14. The method according to claim 8, further comprising establishing collision-relevant data based on the tracking of the target vehicle based on the parameter.

15. A collision detection device for a motor vehicle for the detection of an imminent collision with a remote target vehicle, the collision detection device comprising:
a radar sensor configured to sense radar sensor data of the target vehicle;
LIDAR sensor configured to sense LIDAR sensor data of the target vehicle; and
a control unit configured to track the remote target vehicle in a region surrounding the motor vehicle by:
determining radar reflection points from the radar sensor data;
determining a position specified by a distance and an azimuth angle and a Doppler velocity of points on the target vehicle based on the radar reflection points;
identifying a wheel of the target vehicle based on the position, with a uniformly sized two-dimensional window with an extent in a distance dimension and in an azimuth angle dimension being laid in each case around each radar reflection point and a total of the variances of the Doppler velocities of all radar reflection points contained in the two-dimensional window being established and assigned to the corresponding radar reflection point, and wherein a radar reflection point is determined as a point on a wheel, the total assigned to which is greater than a predefined threshold value;
providing first wheel acquisition data based on the wheel identified from the radar reflection points;
identifying a wheel of the target vehicle from the LIDAR sensor data of the LIDAR sensor;
providing second wheel acquisition data based on the wheel identified from the LIDAR sensor data;
merging the first wheel acquisition data and the second wheel acquisition data; and
establishing a parameter of the target vehicle based on a result of merging the first wheel acquisition data and the second wheel acquisition data.

* * * * *